United States Patent
Hong et al.

(10) Patent No.: US 8,692,423 B2
(45) Date of Patent: Apr. 8, 2014

(54) VIBRATOR

(75) Inventors: Jung Taek Hong, Gyunggi-do (KR); Dae Lyun Kang, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 63 days.

(21) Appl. No.: 13/418,943

(22) Filed: Mar. 13, 2012

(65) Prior Publication Data

US 2013/0154401 A1    Jun. 20, 2013

(30) Foreign Application Priority Data

Dec. 19, 2011  (KR) .......................... 10-2011-0137256

(51) Int. Cl.
*H02K 33/00* (2006.01)

(52) U.S. Cl.
USPC .............................. 310/15; 310/25

(58) Field of Classification Search
USPC .............................. 310/15, 25, 36
See application file for complete search history.

(56) References Cited

U.S. PATENT DOCUMENTS

| | | | |
|---|---|---|---|
| 4,895,495 A * | 1/1990 | Arai ............................. | 417/360 |
| 8,120,214 B2 * | 2/2012 | Jeon ............................. | 310/15 |
| 2005/0184601 A1 * | 8/2005 | Kweon et al. ................. | 310/36 |
| 2007/0194635 A1 * | 8/2007 | Miura .......................... | 310/15 |
| 2007/0216235 A1 * | 9/2007 | Lee ............................. | 310/36 |
| 2011/0050008 A1 * | 3/2011 | Chang et al. .................. | 310/25 |

FOREIGN PATENT DOCUMENTS

| | | |
|---|---|---|
| JP | 09-285096 | 10/1997 |
| JP | 2005-324162 | 11/2005 |
| KR | 10-2005-0122340 A | 12/2005 |
| KR | 10-2010-0119971 | 11/2010 |

* cited by examiner

*Primary Examiner* — Nguyen N Hanh
(74) *Attorney, Agent, or Firm* — McDermott Will & Emery LLP (57) ABSTRACT

There is provided a vibrator, including: a case having an inner space; a coil fixedly mounted on a side wall of the case; an elastic member fixedly mounted on the case so as to be disposed within the coil; a weight body fixedly mounted on the elastic member; and a magnet fixedly mounted on the weight body so as to face the coil.

9 Claims, 7 Drawing Sheets

VIBRATOR

CROSS-REFERENCE TO RELATED APPLICATIONS

This application claims the priority of Korean Patent Application No. 10-2011-0137256 filed on Dec. 19, 2011, in the Korean Intellectual Property Office, the disclosure of which is incorporated herein by reference.

BACKGROUND OF THE INVENTION

1. Field of the Invention

The present invention relates to a vibrator.

2. Description of the Related Art

As a vibrator used for a mobile phone, a tablet PC, or the like, a linear actuator including a plate spring has mainly been used to have long lifespan and fast response properties.

Meanwhile, the most commonly used linear actuator has a structure in which a weight body is mounted on the plate spring. In addition, the weight body is vibrated while moving vertically, together with the plate spring.

Meanwhile, the weight body may generally be formed of a tungsten material having a large specific gravity.

However, in order to increase vibrations in the above-mentioned structure, there is a need to increase a size of the weight body and increase a length thereof in a vertical direction, which is directly connected to an increase in the thickness of the vibrator. As a result, it is difficult to implement thinness in the vibrator.

That is, a development of a structure capable of increasing vibrations while implementing thinness in the vibrator is urgently required.

A vibrator including the plate spring is disclosed in the following citations 1 and 2, Korean Patent Laid-Open Publication No. 2005-0122340 and Korean Patent Laid-Open Publication No. 2010-0119971.

SUMMARY OF THE INVENTION

An aspect of the present invention provides a vibrator capable of increasing vibrations while realizing slimming thereof.

According to an aspect of the present invention, there is provided a vibrator, including: a case having an inner space; a coil fixedly mounted on a side wall of the case; an elastic member fixedly mounted on the case so as to be disposed within the coil; a weight body fixedly mounted on the elastic member; and a magnet fixedly mounted on the weight body so as to face the coil.

The vibrator may further include a protective member fixedly mounted on an inner surface of the coil to prevent the coil from being damaged.

The vibrator may further include a circuit board drawn out to an outside of the case from an inside thereof and connected to the coil.

The elastic member may be formed as a plate spring.

The elastic member may include a weight body bonding part to which the weight body is bonded, an elastic deformation part extending from the weight body bonding part, and a fixing part extending from the elastic deformation part so as to be fixedly mounted on the case.

The coil may have a cylindrical shape so as to have the magnet disposed therein.

The weight body may have a disc shape and may include a mounting part formed on an outer peripheral surface thereof, the mounting part having the magnet mounted thereon.

The protective member may be formed of a film made of a non-magnetic synthetic resin material.

The vibrator may further include a damping member mounted on the case so as to face the weight body to reduce an impact generated when the weight body contacts the case.

According to another aspect of the present invention, there is provided a vibrator, including: a case having an inner space; a coil fixedly mounted on a side wall of the case; an elastic member fixedly mounted on the case so as to be disposed within the coil; a weight body fixedly mounted on the elastic member; a magnet fixedly mounted on the weight body so as to face the coil; a protective member fixedly mounted on an inner surface of the coil to prevent the coil from being damaged; a circuit board mounted on a top surface of the coil and having one end drawn out to an outside of the case; and a damping member mounted on the case so as to face the weight body to reduce an impact generated when the weight body contacts the case.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, when it is determined that the detailed description of the known art related to the present invention may obscure the gist of the present invention, the detailed description thereof will be omitted.

Figure 1:
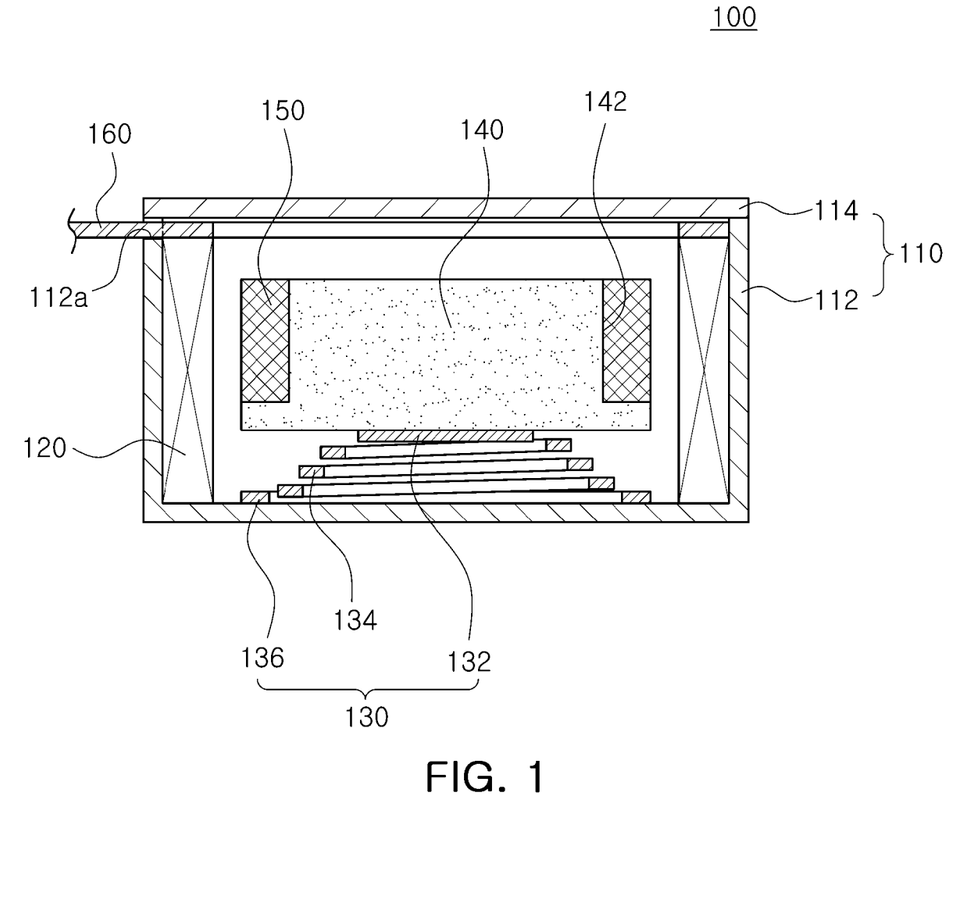
FIG. 1 is a schematic block view showing a vibrator according to an embodiment of the present invention.
Figure 2:
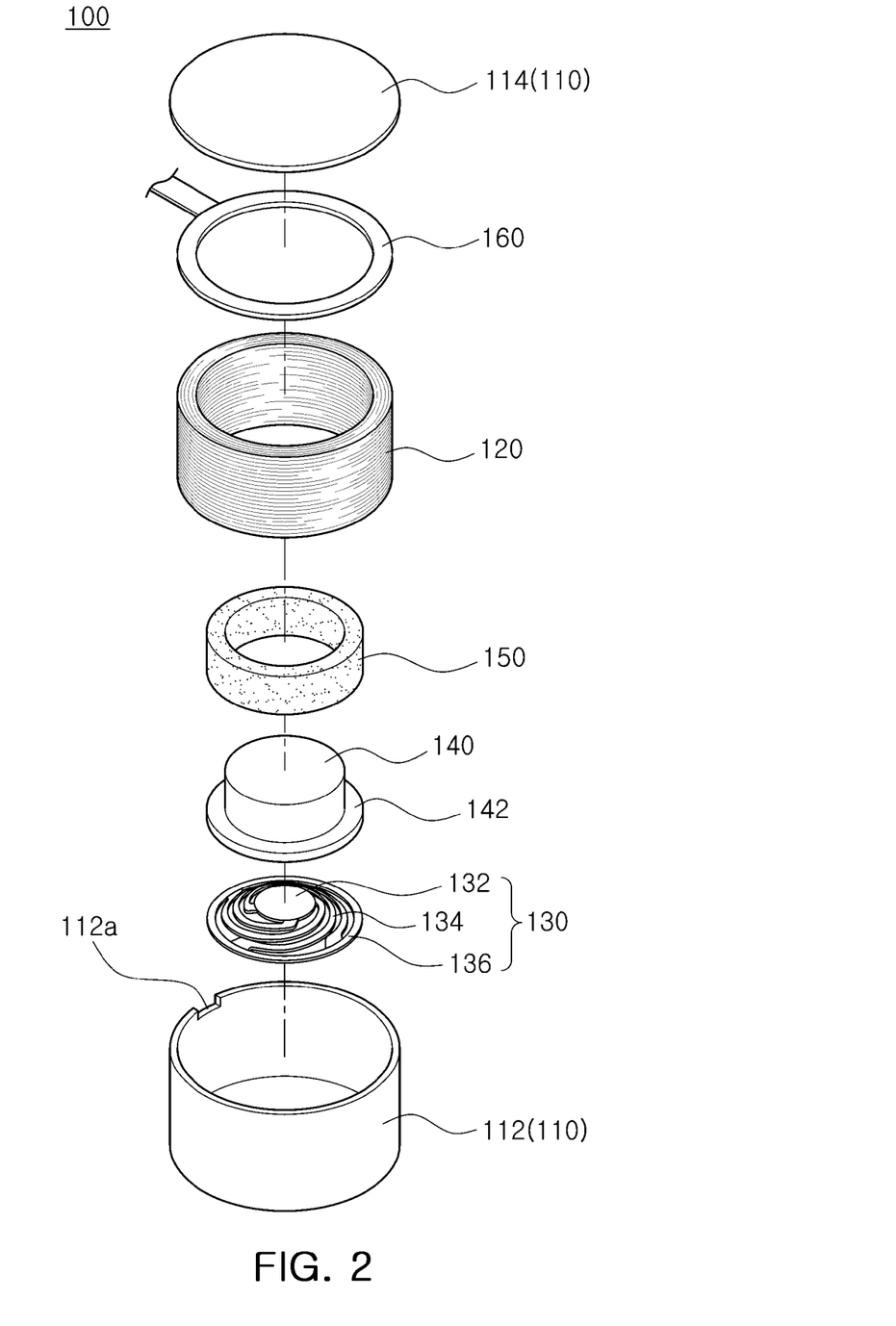
FIG. 2 is an exploded perspective view of the vibrator according to the embodiment of the present invention.

FIG. 1 is a schematic block view showing a vibrator according to an embodiment of the present invention and FIG. 2 is an exploded perspective view of the vibrator according to the embodiment of the present invention.

Referring to FIGS. 1 and 2, a vibrator 100 according to an embodiment of the present invention may include a case 110, a coil 120, an elastic member 130, a weight body 140, a magnet 150, and a circuit board 160.

The case 110 may be formed to have an inner space and may be formed of a non-magnetic material.

Meanwhile, the case 110 may include a lower case 112 and an upper case 114.

The lower case 112 may have a circular dish shape and a side wall thereof may be provided with a drawing groove 112a through which the circuit board 160 may be drawn.

Further, the upper case 114 may be coupled with the lower case 112 to serve to seal the inner space.

The embodiment of the present invention describes, by way of example, a case in which the case 110 has a circular shape, but is not limited thereto. Therefore, the case 110 may have a polygonal shape.

The coil 120 may be fixedly mounted on the side wall of the case 110. That is, the coil 120 may be disposed on an edge of the lower case 112. In addition, the coil 120 may have a hollow cylindrical shape.

Further, the elastic member 130, the weight body 140, and the magnet 150 may be disposed within the coil 120.

The elastic member 130 may be fixedly mounted on the case 110 so as to be disposed within the coil 120. That is, the elastic member 130 may be formed as a plate spring and an edge of the elastic member 130 may be fixedly mounted on the lower case 112.

Meanwhile, the elastic member 130 may include a weight body bonding part 132 to which the weight body 140 is bonded, an elastic deformation part 134 extending from the weight body bonding part 132, and a fixing part 136 extending from the elastic deformation part 134 so as to be fixedly mounted on the case 110.

The weight body bonding part 132 may have a disc shape so as to increase a contact area with the weight body 140.

Further, one end of the elastic deformation part 134 is connected to the weight body bonding part 132 and the other end thereof is connected to the fixing part 136, such that the weight body bonding part 132 may be stretched so as to be vertically vibrated.

Further, the fixing part 136 may be fixedly mounted on the lower case 112 and may have a circular ring shape.

Figure 3A:
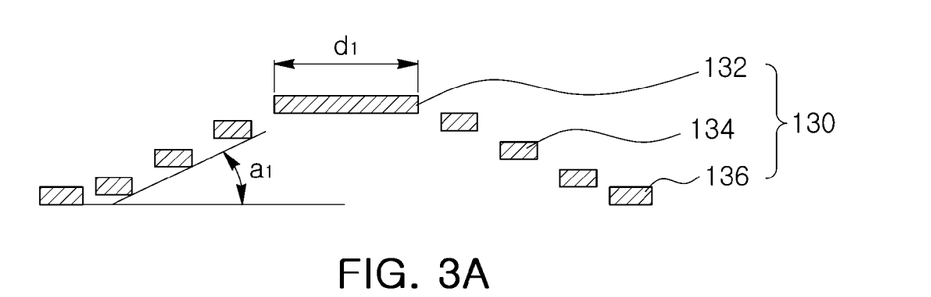
FIGS. 3A, 3B, and 3C are views for explaining various modified embodiments of an elastic member included in the vibrator according to the embodiment of the present invention.
Figure 3B:
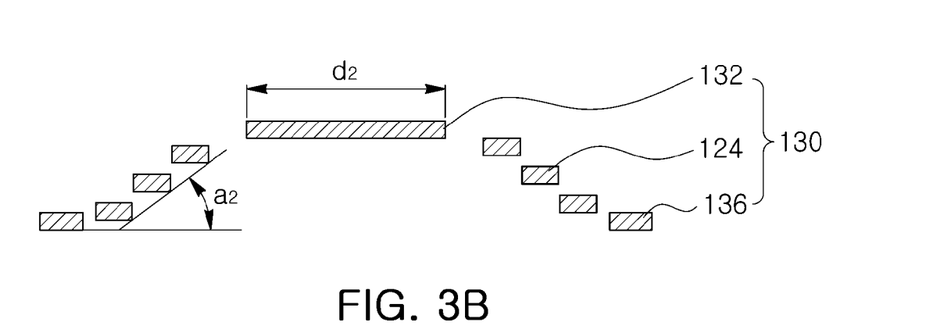
Figure 3C:
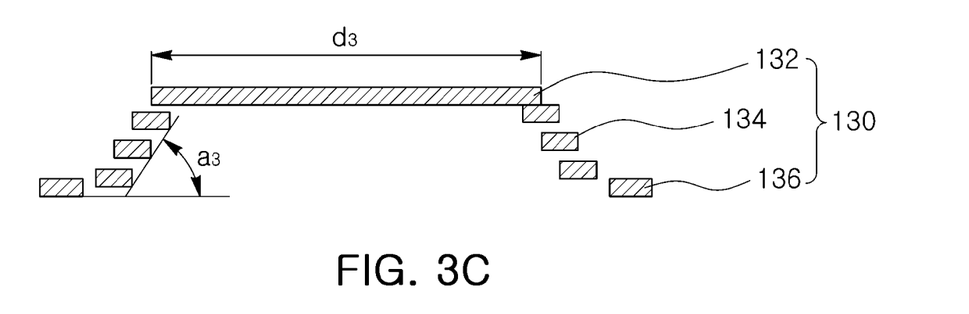

Meanwhile, as shown in FIG. 3, diameters d1, d2, and d3 of the weight body bonding part 132 may be varied according to angles a, b, and c formed by the elastic deformation part 134 and the fixing part 136.

Further, the diameters d1, d2, and d3 of the weight body bonding part 132 may be increased and reduced, in proportion to the angles a, b, and c formed by the elastic deformation part 134 and the fixing part 136.

The weight body 140 may be fixedly mounted on the elastic member 130. That is, the weight body 140 may be fixedly mounted on a top surface of the weight body bonding part 132 of the elastic member 130.

Further, the weight body 140 may have a disc shape and may include a mounting part formed on an outer peripheral surface thereof, wherein the mounting part has the magnet 150 mounted thereon.

In addition, a central portion of the weight body 140 included in the vibrator 100 according to the embodiment of the present invention may not be provided with a hole, whereby the entire thickness of the weight body 140 may be reduced.

In addition, since the central portion of the weight body 140 may not be provided with a hole, the weight body 140 may be formed of a material having a low specific gravity. That is, the weight body 140 may be formed of, for example, a tungsten material having a low specific gravity.

The magnet 150 may be fixedly mounted on the weight body 140 so as to face the coil 120. That is, the magnet 150 may be fixedly mounted on the mounting part 142 of the weight body 140 and an outer peripheral surface of the magnet 150 may be disposed so as to face an inner peripheral surface of the coil 120.

In addition, the magnet 150 may have a circular ring shape.

As described above, since the magnet 150 may be disposed so as to face the coil 120, the magnet 150 and the weight body 140 may be vibrated by electromagnetic interaction between the coil 120 and the magnet 150 when power is supplied to the coil 120.

Further, since the magnet 150 may be mounted on the mounting part 142 of the weight body 140, the contact area of the magnet 150 and the weight body 140 may be increased, thereby increasing coupling strength of the magnet 150 and the weight body 140.

Therefore, it is possible to suppress the magnet 150 from being separated from the weight body 140.

The circuit board 160 may be drawn out to the outside of the case 110 from the inside thereof and may be connected to the coil 120. Further, the circuit board 160 may be a flexible circuit board and may be electrically connected to the coil 120.

In the operation of vibration generation, when an alternating current having a resonance frequency is applied to the coil 120, driving force vibrating the magnet 150 may be generated by the electromagnetic interaction between the coil 120 and the magnet 150 facing the coil 120.

Further, the driving force applied to the magnet 150 may be transferred to the elastic member 130 to thereby vertically vibrate the weight body 140 and the magnet 150.

As described above, a structure in which the coil 120 is disposed on the edge of the case 110 and the magnet 150 is disposed within the coil 120 may be used, the thickness of the weight body 140 may be reduced while maintaining the weight of the weight body 140.

Therefore, the thinning of the vibrator 100 may be implemented.

Further, since the magnet 150 may be mounted on the mounting part 142 of the weight body 140, the contact area of the magnet 150 and the weight body 140 may be increased, thereby increasing the coupling strength of the magnet 150 and the weight body 140.

Therefore, it is possible to suppress the magnet 150 from being separated from the weight body 140.

Further, the central portion of the elastic member 130 may not be provided with a hole and therefore, the shape of the elastic member 130 may be variously changed according to the thinness, as shown in FIG. 3.

Hereinafter, a vibrator according to another embodiment of the present invention will be described with reference to the drawings. However, the same components as the above-mentioned components will be replaced with the above description and therefore, the detailed description thereof will be omitted.

Figure 4:
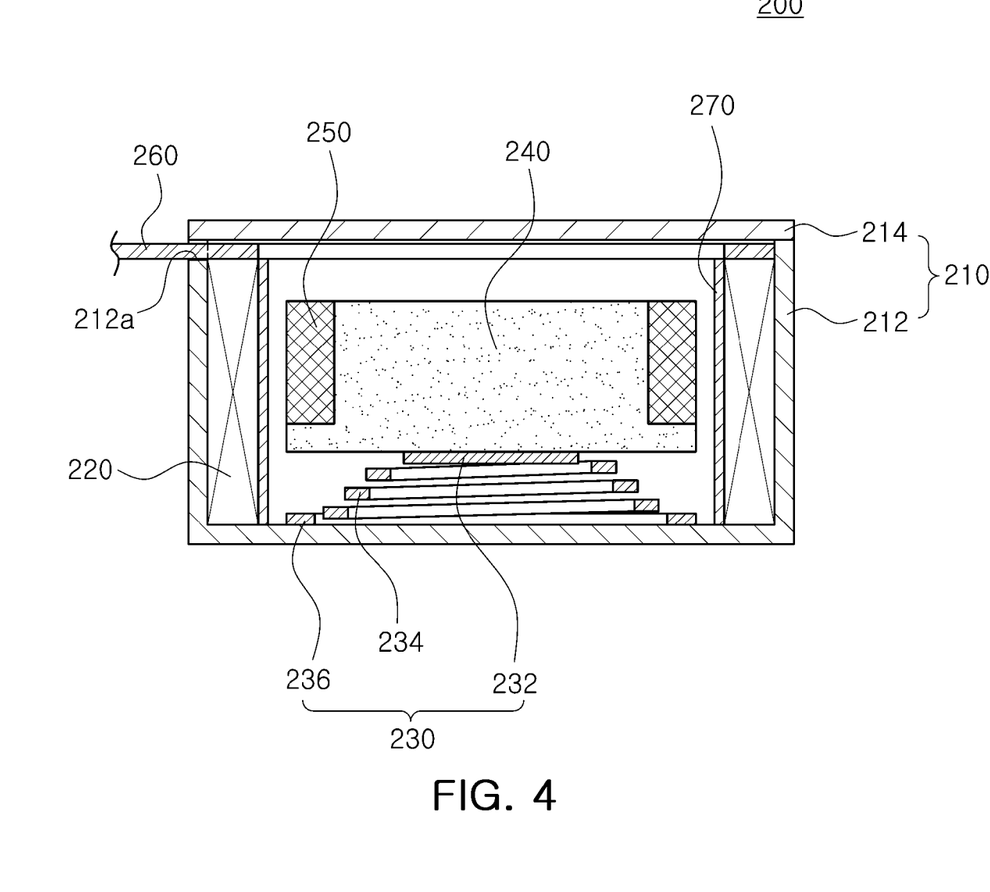
FIG. 4 is a schematic cross-sectional view of a vibrator according to another embodiment of the present invention.
Figure 5:
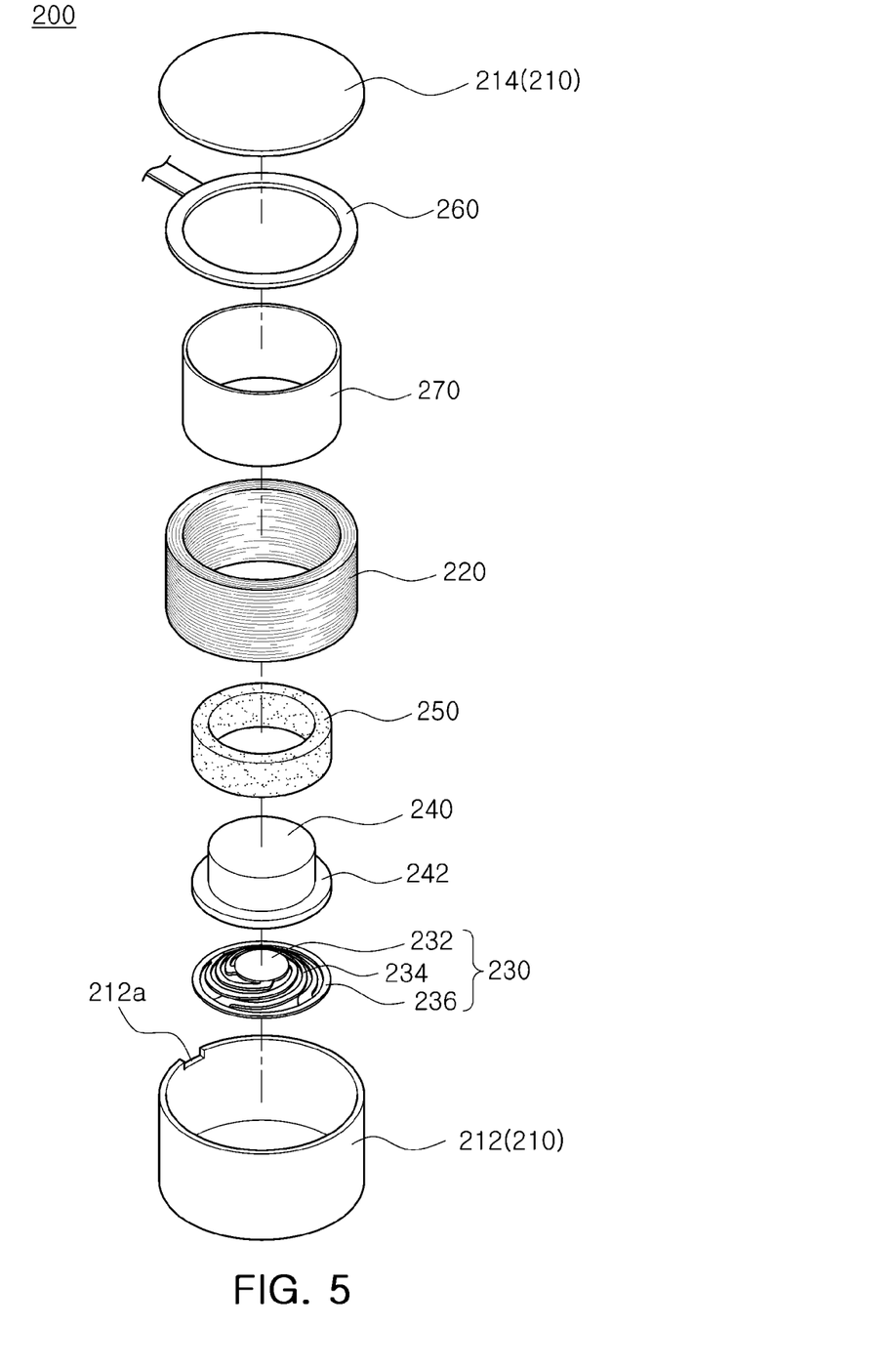
FIG. 5 is an exploded perspective view of the vibrator according to another embodiment of the present invention.

FIG. 4 is a schematic cross-sectional view of a vibrator according to another embodiment of the present invention. FIG. 5 is an exploded perspective view of the vibrator according to another embodiment of the present invention.

Referring to FIGS. 4 and 5, a vibrator 200 according to an embodiment of the present invention may include a case 210, a coil 220, an elastic member 230, a weight body 240, a magnet 250, a circuit board 260, and a protective member 270.

Meanwhile, the case 210, the coil 220, the elastic member 230, the weight body 240, the magnet 250, and the circuit board 260 included in the vibrator 200 according to another embodiment of the present invention are regarded to have the same configurations as and correspond to the case 110, the coil 120, the elastic member 130, the weight body 140, the magnet 150, and the circuit board 160 included in the vibrator 100 according to the foregoing embodiment of the present invention and therefore, the detailed description thereof will be omitted and will be replaced with the above description.

The protective member 270 may be fixedly mounted on an inner surface of the coil 220 to prevent damage of the coil 220. That is, the protective member 270 serves to prevent the coil 220 from being damaged due to the contact of the weight body 140 and the magnet 250 with the coil 220 when the weight body 240 and the magnet 250 are vibrated.

To this end, the protective member 270 may be formed of a non-magnetic material. Further, the protective member 270 may be formed of a synthetic resin material.

Further, the protective member 270 may be formed of a film having a thin plate shape. That is, the protective member 270 may be formed of a film so as to secure a vibration space for the weight body 240 and the magnet 250.

As described above, it is possible to suppress a reduction in a vibration space for the weight body 240 and the magnet 250 while preventing the coil 220 from being damaged, through the protective member 270 formed of the film.

Hereinafter, a vibrator according to another embodiment of the present invention will be described with reference to the drawings.

Figure 6:
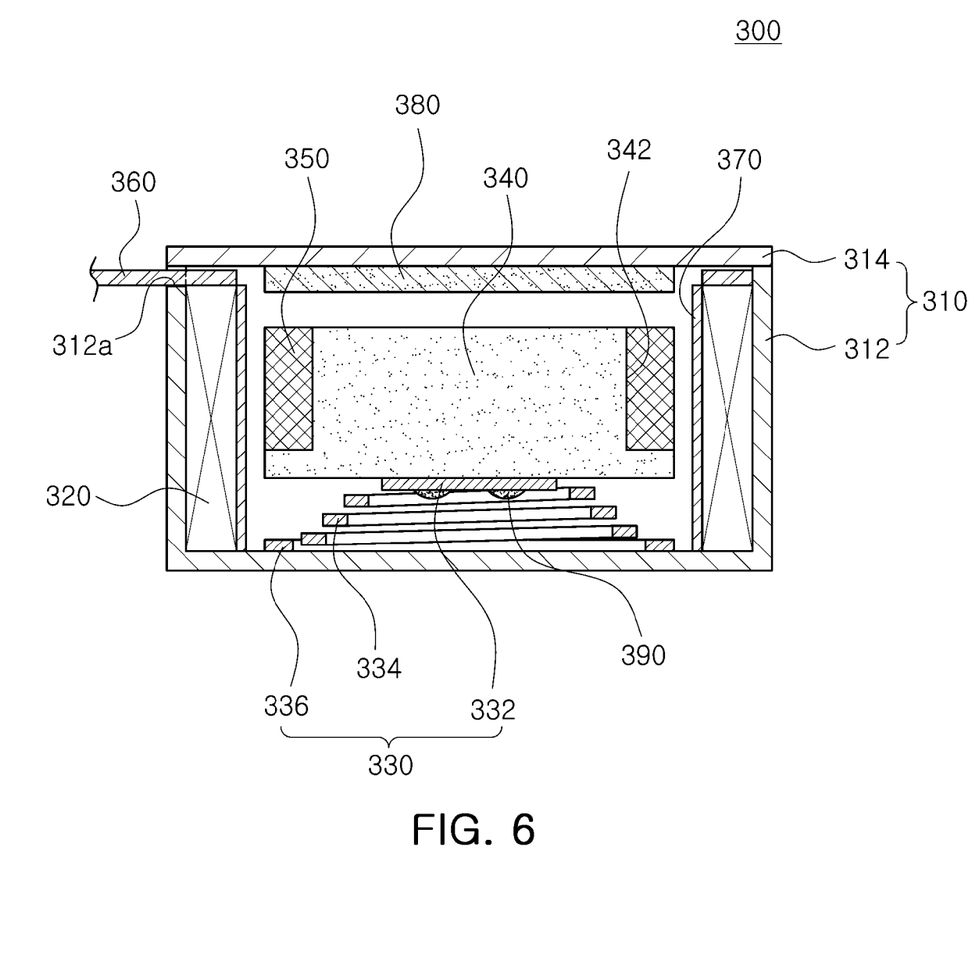
FIG. 6 is a schematic cross-sectional view showing a vibrator according to another embodiment of the present invention.
Figure 7:
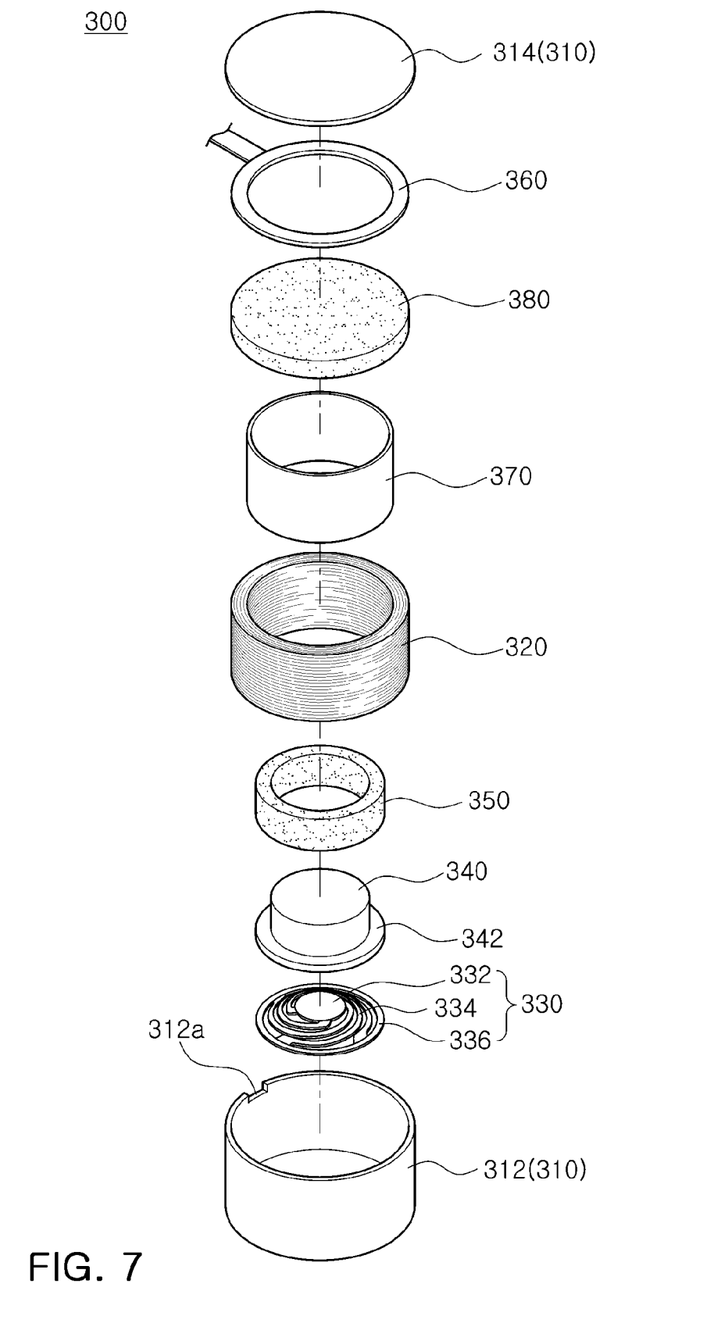
FIG. 7 is an exploded perspective view of the vibrator according to another embodiment of the present invention.

FIG. 6 is a schematic cross-sectional view showing a vibrator according to another embodiment of the present invention. FIG. 7 is an exploded perspective view of the vibrator according to another embodiment of the present invention.

Referring to FIGS. 6 and 7, a vibrator 300 according to another embodiment of the present invention may include, for example, a case 310, a coil 320, an elastic member 330, a weight body 340, a magnet 350, a circuit board 360, a protective member 370, and a damping member 380.

Meanwhile, the case 310, the coil 320, the elastic member 330, the weight body 340, the magnet 350, and the circuit board 360 included in the vibrator 300 according to another embodiment of the present invention are regarded to have the same configurations as and correspond to the case 110, the coil 120, the elastic member 130, the weight body 140, the magnet 150, and the circuit board 160 included in the vibrator 100 according to the foregoing embodiment of the present invention and therefore, the detailed description thereof will be omitted and will be replaced with the above description.

In addition, the protective member 370 included in the vibrator 300 according to another embodiment of the present invention is regard to have the same configuration as and corresponds to the protective member 270 included in the vibrator 200 according to another embodiment of the present invention and therefore, the detailed description thereof will be omitted and will be replaced with the above description.

The damping member 380 may be mounted on the case 310 so as to face the weight body 340 to thereby reduce an impact due to contact between the case 310 and the weight body 340. That is, the damping member 380 may be mounted on a bottom surface of an upper case 314 to prevent contact between the weight body 340 and the upper case 314 when the weight body 340 is vibrated, and further, the damping member 380 may mitigate the impact applied to the upper case 314 from the weight body 340.

To this end, the damping member 380 may be formed of an elastic material.

Further, the damping member 380 may have a disc shape. However, the embodiment of the present invention is not limited thereto and the damping member 380 may have a circular ring shape so as to contact an edge of the weight body 240.

As described above, since the damping member 380 is mounted on the bottom surface of the upper case 314, noise occurring when the weight body 340 contacts the upper case 314 may be reduced and breakages of the weight body 340 and the upper case 314 due to the contact of the weight body 340 and the upper case 314 may be reduced.

Meanwhile, a magnetic fluid 390 may be applied to a bottom surface of a weight body bonding part 332 of the elastic member 330 so as to reduce noise occurring when the weight body bonding part 332 contacts a lower case 312.

As described above, noise occurrences may be reduced through the damping member 380 and the magnetic fluid 390.

As set forth above, according to the embodiments of the present invention, a thickness of the weight body can be reduced to implement the thinning of the weight body and the vibrator, and vibrations may be increased by changing the shape of the spring.

Further, according to the embodiments of the present invention, the damage of the coil can be reduced by using the protective member.

While the present invention has been shown and described in connection with the embodiments, it will be apparent to those skilled in the art that modifications and variations can be made without departing from the spirit and scope of the invention as defined by the appended claims.

What is claimed is:

1. A vibrator, comprising:
a case having an inner space;
a coil fixedly mounted on a side wall of the case;
an elastic member fixedly mounted on the case so as to be disposed within the coil;
a weight body fixedly mounted on the elastic member; and
a magnet fixedly mounted on the weight body so as to face the coil,
wherein the weight body has a disc shape and includes a mounting part formed on an outer peripheral surface thereof, the mounting part having the magnet mounted thereon, and
wherein a bottom surface and an inner peripheral surface of the magnet are bonded to the mounting part.

2. The vibrator of claim 1, further comprising a protective member fixedly mounted on an inner surface of the coil to prevent the coil from being damaged.

3. The vibrator of claim 2, wherein the protective member is formed of a film made of a non-magnetic synthetic resin material.

4. The vibrator of claim 1, further comprising a circuit board drawn out to an outside of the case from an inside thereof and connected to the coil.

5. The vibrator of claim 1, wherein the elastic member is formed as a plate spring.

6. The vibrator of claim 5, wherein the elastic member includes a weight body bonding part to which the weight body is bonded, an elastic deformation part extending from the weight body bonding part, and a fixing part extending from the elastic deformation part so as to be fixedly mounted on the case.

7. The vibrator of claim 1, wherein the coil has a cylindrical shape so as to have the magnet disposed therein.

8. The vibrator of claim 1, further comprising a damping member mounted on the case so as to face the weight body to reduce an impact generated when the weight body contacts the case.

9. A vibrator, comprising:
a case having an inner space;
a coil fixedly mounted on a side wall of the case;
an elastic member fixedly mounted on the case so as to be disposed within the coil;
a weight body fixedly mounted on the elastic member;
a magnet fixedly mounted on the weight body so as to face the coil;
a protective member fixedly mounted on an inner surface of the coil to prevent the coil from being damaged;
a circuit board mounted on a top surface of the coil and having one end drawn out to an outside of the case; and
a damping member mounted on the case so as to face the weight body to reduce an impact generated when the weight body contacts the case,
wherein the weight body has a disc shape and includes a mounting part formed on an outer peripheral surface thereof, the mounting part having the magnet mounted thereon, and
wherein a bottom surface and an inner peripheral surface of the magnet are bonded to the mounting part.

\* \* \* \* \*